No. 12,737.
REISSUED DEC. 31, 1907.
W. J. RICHARDS.
FLUID PRESSURE SYSTEM.
APPLICATION FILED OCT. 2, 1907.
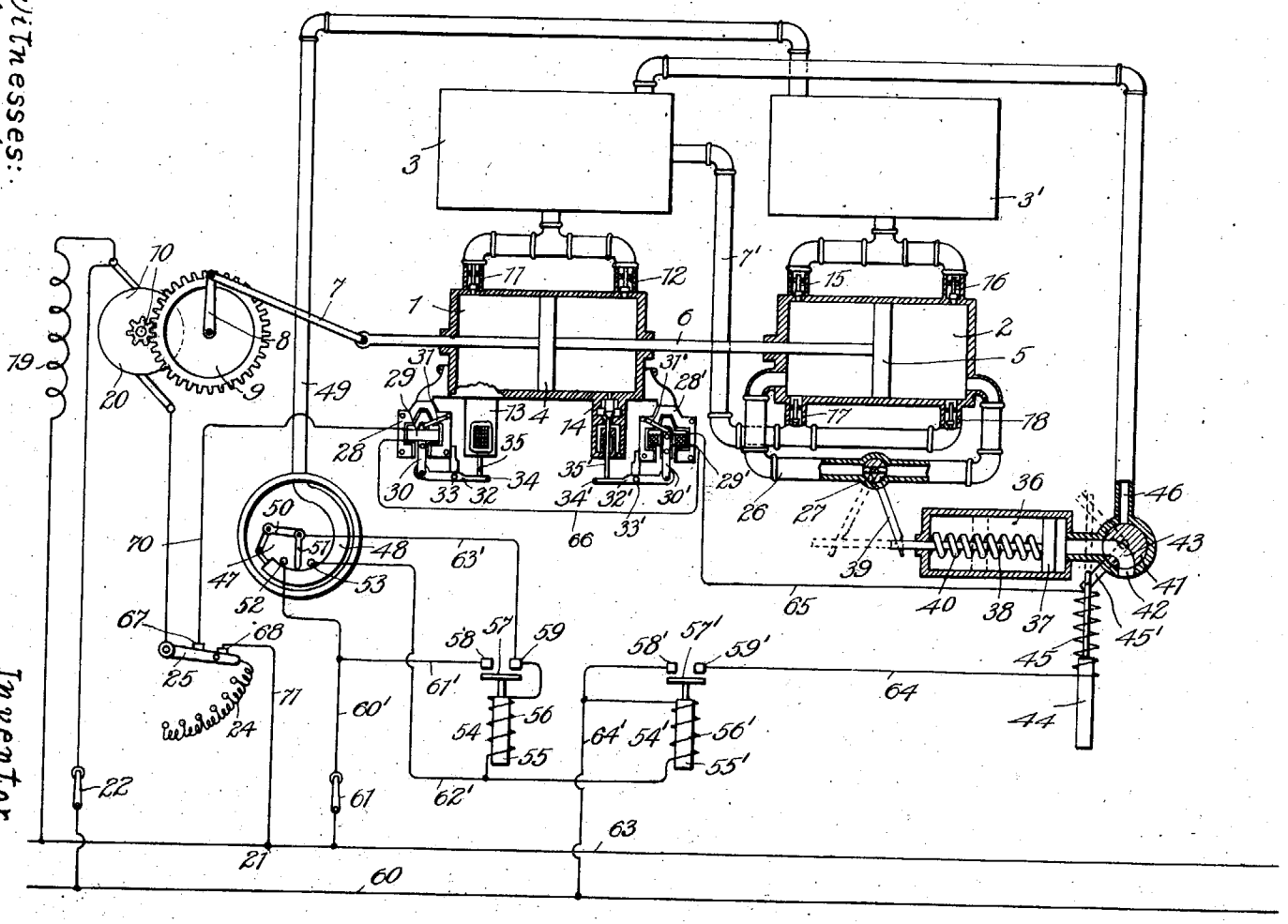
Witnesses:
George E. Higham
Fred W. Kohn.
Inventor
Walter J. Richards
By Charles A. Brown
Attorney.

UNITED STATES PATENT OFFICE.

WALTER J. RICHARDS, OF MILWAUKEE, WISCONSIN.

FLUID-PRESSURE SYSTEM.

No. 12,737. Specification of Reissued Letters Patent. Reissued Dec. 31, 1907.

Original No. 858,470, dated July 2, 1907, Serial No. 233,397. Application for reissue filed October 2, 1907. Serial No. 395,659.

*To all whom it may concern:*

Be it known that I, WALTER J. RICHARDS, a citizen of the United States, residing at Milwaukee, in the county of Milwaukee and State of Wisconsin, have invented a certain new and useful Improvement in Fluid-Pressure Systems, of which the following is a full, clear, concise, and exact description, reference being had to the accompanying drawings, forming a part of this specification.

My invention relates to means for controlling the operation of pressure systems, particularly those in which pumps or compressors are continuously driven by means of an electric motor and the main object of my invention is to provide means depending directly upon the pressure in the system supplied for rendering the compressors effective during a certain range of minimum pressure in the system and for rendering the compressor ineffective when a certain maximum pressure in the system is reached.

In my co-pending application, Serial No. 164,085, filed July 2, 1903, I have described a system in which the operation of the motor depends upon and is controlled by the pressure in the system, the motor operating upon existence of a certain range of minimum pressure in the system and being disconnected from its supply circuit when a certain maximum pressure is reached. In my present invention, however, the motor is connected directly with the supply source and continuously drives the piston of the compressor. The compressor, although continuously driven, is rendered ineffective during maximum pressure in the system supplied and I associate electromagnetic means with the valves thereof for rendering the compressor effective after a certain minimum pressure is reached and these electromagnetic means are included in a circuit controlled directly by the pressure in the system supplied. I also provide automatic means for preventing effective actuation of the compressor until the motor has been brought to its normal speed. I also employ a high pressure and a low pressure compressor for supplying the pressure system, the pistons of the compressors being connected in tandem and with the driving motor.

My invention will be best understood when described with reference to the accompanying drawing in which I have shown diagrammatically a pressure system in which a low pressure cylinder 1 and a high pressure cylinder 2 are connected respectively with an intermediate reservoir 3, and a main reservoir 3′. The respective pistons 4 and 5 are connected to a common piston shaft 6, which is connected by a connecting rod 7 with the crank arm 8 of the driving gear 9 driven by the electric motor 10. The low pressure cylinder is provided with discharge valves 11 and 12 connected with the intermediate reservoir and with suction valves 13 and 14 receiving from the atmosphere, while the high pressure cylinder is provided with discharge valves 15 and 16 connected with the main reservoir and suction valves 17 and 18 receiving from the intermediate reservoir through a pipe 7′. The motor 10 is preferably of the shunt type and has a field winding 19 and an armature 20, the field winding being shown as connected directly with the supply circuit 21 by means of a switch 22 and the armature is adapted for connection with the supply circuit by means of a rheostat comprising resistances 24 and a rheostat lever 25. The motor after being started is intended to run continuously to continuously drive the pistons of the compressors. Normally, however, or during maximum pressure in the supply circuit, the suction valves of the compressors are rendered inoperative to prevent effective operation of the compressors. For the high pressure cylinder, for instance, I employ a by-pass 26 which is normally open through a valve 27 to render this compressor ineffective. With the suction valves of the low pressure cylinder, however, I associate electromagnetic mechanism which is normally adjusted to mechanically hold the suction valves from their seats to thus render the low pressure compressor ineffective. This electromagnetic mechanism consists of an electromagnet frame 28 suspended from the compressor wall and which supports an energizing winding 29 surrounding a reciprocating core 30. This core is suspended from a link 31 and connected with one end of a lever 32 pivoted to an extension 33 from the field frame 28. The end 34 of the lever 32 is disposed below the stem 35 of the corresponding suction valve and normally the weight of the core 30 causes the lever 32 to unseat the suction valve. Upon energization, however, of the energizing winding 29 the lever is removed to allow effective actuation of the suction valve and the compressor then becomes effective.

A pneumatic cylinder 36 is provided with a piston 37 whose rod 38 engages the end of a valve lever 39 connected with the valve 27 in the by-pass 26. A coil spring 40 within the cylinder 36 normally maintains the piston at the end of the cylinder and holds the valve 27 in an open position to render the high pressure compressor ineffective. The end of the cylinder 36 may be connected with the reservoir 3 through a valve 41 which normally connects the cylinder with the atmosphere outlet 42 through the valve channel 43. A solenoid core 44 connects with the valve lever 45′ and the weight of the core normally holds this lever to maintain connection between the cylinder 36 and the atmosphere, as shown, Upon energization of the solenoid winding 45, however, the core is raised and the valve moved until the passage 43 connects the cylinder 36 with the outlet 46 leading to the reservoir 3, as shown in dotted lines. Upon pressure being thus admitted to the cylinder 36 the piston 37 is driven forwardly and the valve 27 closed to allow the high pressure compressor to become effective.

A Bourdon gage 47 has its actuating tube 48 connected with the reservoir 3′ through piping 49, the end of said tube being connected through link mechanism 50 with a switch arm 51 adapted to engage with a minimum contact point 52 and a maximum contact point 53. An electromagnetic switch 54 consists of a core 55 and a solenoid winding 56, a switch arm 57 secured to the core being adapted to connect the contacts 58 and 59 upon current flow through the winding 56. A similar electromagnetic switch 54′ consists of a core 55′, a winding 56′, a switch arm 57′ and the contacts 58′ and 59′.

The minimum gage contact 52 connects with the main 63 through conductor 60′ and the switch 61, the contact 58 connecting with conductor 60′ through conductor 61′. The maximum gage contact 53 connects with one end of the windings 56 and 56′ through the conductor 62′. The contact 59 connects with the other end of the winding 56 and with the gage arm 51 through the conductor 63′. The contact 58′ connects with the main 60 and with the other end of winding 56′ through conductor 64′ while contact 59′ connects with one end of the solenoid winding 45 through conductor 64. A conductor 65 connects the other end of winding 45 with the winding 29′ of the valve controlling electromagnet 28′ and a conductor 66 connects the winding 29′ with the winding 29 of the suction valve controlling electromagnet 28. To prevent energization of the suction valve electromagnetic controlling mechanism before the motor has reached normal or full speed, I associate switch contacts 67 and 68 with the rheostat arm 25 and adapted to be connected by said arm only after all the resistance 24 has been removed from the motor circuit, and consequently the motor will not suddenly be subjected to the full effective resistance of the compressors until fully connected in circuit and at normal speed.

The operation of the system is as follows: At the outset the motor 10 is started and brought to normal speed upon actuation of the rheostat arm 25 to remove the resistance 24 from circuit and during this time the compressors will be ineffective independent of the pressure in the system. When the rheostat arm is brought to its last position it will electrically connect the contacts 67, 68 to complete at this point the circuit including the compressor controlling electromagnetic means. If the pressure in the system is too low, the arm 51 of the Bourdon gage will engage the minimum contact point 52, as shown in dotted lines, and a circuit will then flow from the main 63 through the switch 61, conductor 60′, contact 52, switch arm 51, conductor 63′, contact 59, winding 55 of the switch 54, conductor 62′, winding 56′ and conductor 64′ to main 60, and switch arms 57 and 57′ are moved to connect respectively the contacts 58, 59 and 58′ and 59′. Current will now flow from the main 60 through the conductor 64′, contacts 58′, 59′, conductor 64, winding 45, conductor 65, winding 29′, conductor 70, contact 67, switch arm 25, contact 68 and through conductor 71 to main 63. The levers 32 and 32′ will be moved to release the suction valves 13 and 14 of the low pressure compressor which will become effective and will force air into the reservoir 3. The core 44 upon attraction within the winding 45 will actuate the valve 41 to connect the cylinder 36 with the reservoir 3 and upon pressure entering this cylinder the piston 37 will be actuated to cause closure of the valve 27 and the high pressure cylinder becomes effective and will force air into the main reservoir 3′. The connection of the contacts 58 and 59 by the switch arm 57, closes a short circuit about the gage contact 52 and gage arm 51, current then flowing directly from the conductor 60′ to the windings 56 and 56′ and the gage is thus protected from continued heavy current flow. The effective operation of the compressors continues until a certain maximum pressure is reached when the gage arm 51 will engage the maximum contact 53 and a short circuit will be closed about winding 56 through the conductor 63′, gage arm 51, contact 53 and conductor 62′. The contacts 58 and 59 upon release of the core 55 with switch arm 57, will be disconnected, thus opening the circuit through the windings 56 and 56′, whereupon the contacts 58′ and 59′ will also be disconnected, and the circuit through the compressor controlling electromagnetic means will be interrupted. The cores of the electromagnets 28 and 28′ which have become deënergized will move the levers 32 and 32′ to again raise the suction valves 13, 14 from their seats to render the low pressure ineffective. The solenoid core 44 being released, returns the valve 43 to connect the cylinder 36 with the atmosphere and the spring 40 returns the piston 37 to its normal position to cause the valve 27 in the bypass 26 to be opened and the high pressure compressor also becomes ineffective, the motor, however, continuing to operate. Upon minimum pressure being again reached, the various electromagnetic mechanisms will again become effective until the maximum pressure is again reached, and so on.

I have thus shown a system in which the driving motor continuously runs independently of the pressure in the system and in which the effective operation of the compressors actuated by the motor is dependent upon electromagnetic controlling means included in a circuit directly controlled by the pressure in the system, the compressors being effective during a certain range of minimum pressure in the system and ineffective when a maximum pressure is reached. I have also rendered it impossible to throw the full compressor load on the motor until the motor has been brought to its normal speed.

As many modifications may be made in the construction and arrangement of the various parts of the system, I do not wish to be limited to the exact arrangement and construction herein shown.

I claim as new and desire to secure by Letters Patent:—

1. In a pressure system, the combination with a fluid pump, of an electric motor driving said pump, means for rendering valves of said pump ineffective upon a maximum pressure in said system, and electromagnetic means for automatically rendering said valves effective upon a certain minimum pressure in said system independently of said motor.

2. In a pressure system, the combination with a fluid pump, of a motor for continuously driving said pump, a circuit for said motor, means for rendering said pump ineffective upon maximum pressure in said system, and electrical means independent of said motor circuit for rendering said pump effective upon a minimum pressure in said system.

3. In a pressure system, the combination with a fluid pump, of a motor for continuously driving said pump, mechanical means for rendering the valves of said pump inoperative upon maximum pressure in said system, and electrical means independent of the motor circuit for rendering the valves effective upon a certain minimum pressure in said system.

4. In a pressure system, the combination with a fluid pump, of a motor for continuously driving said pump, electromagnetic mechanism normally mechanically associated with the valves of said pump, to prevent actuation thereof, whereby said pump is ineffective, and electrical means controlled by the pressure in the system for actuating said electromagnetic mechanism to allow actuation of said valves upon a certain minimum pressure in said system.

5. In a pressure system, the combination with a fluid pump, of an electric motor for continuously driving said pump, electromagnetic mechanism associated with the suction valves of said pump, said electromagnetic mechanism upon maximum pressure in said system being adapted to mechanically prevent actuation of said suction valves to render said pump ineffective, and means controlled upon a certain minimum pressure in said system for causing actuation of said electromagnetic means to release said suction valves to allow said pump to become effective.

6. In a pressure system, the combination with a fluid pump, of a motor for continuously driving said pump, electromagnetic mechanism associated with the suction valves of said pump, a circuit for said electromagnetic mechanism directly controlled by the pressure in said system, means upon a maximum pressure in said system for opening said circuit through said electromagnets, said electromagnets being adapted when deenergized to mechanically cause unseating of the suction valves to render the pump ineffective, and means upon minimum pressure in said system for controlling said circuit to cause energization of said electromagnetic means to release said suction valves whereby said pump becomes effective.

7. In a pressure system, the combination with a fluid pump, of a motor continuously driving said pump, means for rendering the suction valves of said pump inoperative during a maximum pressure in said system, and means for rendering said valves operative during a minimum pressure in said system.

8. In a pressure system, the combination with a fluid pump, of a motor continuously driving said pump, mechanical means for rendering said pump ineffective during maximum pressure in said system, and electromagnetic means for actuating said mechanical means to render said pump effective.

9. In a pressure system, the combination with a fluid pump, of a motor continuously driving said pump, mechanical means for rendering said pump ineffective upon maximum pressure in said system, and electromagnetic means directly controlled by the pressure in said system for actuating said mechanical means to allow effective operation of said pump.

10. In a pressure system, the combination with a fluid pump, of an electric motor continuously driving said pump, a circuit for said motor, mechanical means associated with the valves of said pump for rendering said pump inoperative during maximum pressure in said system and electromagnetic means controlled directly by the pressure in said system for actuating said mechanical means to allow effective operation of said pump, the circuit for said electromagnetic mechanism being entirely independent of the motor circuit.

11. In a pressure system, the combination with a fluid pump, of a motor for continuously driving said pump, electromagnetic means associated with the valves of said pump, said electromagnetic means upon maximum pressure in said system being mechanically disposed to render said valves inoperative to prevent effective operation of the pump, a circuit for said electromagnetic mechanism, and means controlled by the pressure in the system for controlling said circuit, said means upon minimum pressure in said system being actuated to close said circuit to actuate said electromagnetic mechanism to release the valves of the pump to allow effective operation thereof.

12. In a pressure system, the combination with a fluid pump, of a motor for continuously driving said pump, electromagnetic means associated with the valves of said pump, said electromagnetic means upon maximum pressure in said system being mechanically disposed to render said valves inoperative to prevent effective operation of the pump, a circuit for said electromagnetic mechanism, means controlled by the pressure in the system for controlling said circuit, said means upon minimum pressure in said system being actuated to close said circuit to actuate said electromagnetic mechanism to release the valves of the pump to allow effective operation thereof, and means for allowing actuation of said electromagnetic mechanism only when said motor is at normal speed.

13. In a pressure system, the combination with a fluid pump, of an electric motor for continuously driving said pump, means for rendering the valves of said pump inoperative upon maximum pressure in a system, means for rendering said valves operative upon minimum pressure in the system, a circuit for said motor, restricting means in said circuit for gradually bringing said motor to normal speed, and means for preventing said valves from becoming operative until said restricting means is actuated to bring said motor to normal speed.

14. In a pressure system, the combination with a fluid pump, of an electric motor for driving said pump, electromagnetic mechanism associated with the suction valves of said pump, said electromagnetic mechanism being normally mechanically disposed to prevent actuation of said valves upon maximum pressure in said system, a circuit for said motor, a starting resistance in said circuit for said motor, a circuit for said electromagnetic mechanism, pneumatic switching means controlled directly by the pressure in the system for controlling said electromagnetic mechanism circuit, a certain minimum pressure in said system causing actuation of said pneumatic mechanism to close said circuit at one point, and normally open contacts adapted to be closed only when said motor has been brought to normal speed, energization of said electromagnets upon closure of their circuit causing said suction valves to be released to allow effective operation of the pump.

15. In a pressure system, the combination with a fluid pump for supplying said system, of a motor for continuously driving said pump, mechanism for normally mechanically maintaining the valves of the pump in an inoperative condition upon maximum pressure in the system, electromagnetic mechanism adapted upon energization to release said valves to allow effective operation of the pump, a circuit for said electromagnetic mechanism directly controlled by the pressure in said system when said motor is at normal speed, and means for maintaining said circuit in an open condition until said motor reaches normal speed upon the initial starting thereof.

16. In a pressure system, the combination with a fluid pump for supplying said system, of an electric motor for continuously actuating the piston of said pump, means for preventing actuation of the valves of the pump upon maximum pressure in said system, electromagnetic means associated with the pump valves adapted upon energization to release the valves to allow effective operation of the pump, a circuit for said electromagnetic means, additional electromagnetic means controlled by the pressure in the system for controlling said circuit, minimum pressure in said system causing said circuit to be closed to energize said electromagnetic means, a maximum pressure in the system causing said circuit to be opened, a circuit for said motor, a rheostat in said circuit for initially starting said motor, and means associated with said rheostat for closing said electromagnetic circuit after said rheostat has been actuated to bring said motor to normal speed.

17. In a pressure system, the combination with a fluid pump for supplying said system, of a motor for continuously reciprocating the piston of said pump, means associated with the suction valves of said pump for normally rendering said pump ineffective, electromagnetic means for causing said valves to become operative, and a circuit for said electromagnetic mechanism directly controlled by the pressure in the system, minimum pressure in said system causing closure of said circuit whereby said electromagnetic means becomes active to render said pump effective, maximum pressure causing opening of said circuit whereby said electromagnetic means becomes inactive and the pump ineffective.

18. In a pressure system, the combination with a fluid pump for supplying said system, of an electric motor for continuously driving said pump, means for normally rendering the pump ineffective, electromagnetic means for rendering the pump effective, an electric circuit for said electromagnetic means normally discontinuous, means controlled directly by the pressure in the system for controlling the continuity at one point of the circuit, starting means for gradually supplying current to said motor, and means associated with said starting means for controlling the continuity of the electromagnetic circuit at a second point, the circuit at said point being closed only after actuation of the starting means to bring the motor to normal speed, minimum pressure in said system causing closure of the electromagnetic circuit at the first point to cause energization of the electromagnetic means to render the pump effective.

19. In a fluid pressure system, the combination with a low pressure and a high pressure pump, of an electric motor for continuously and simultaneously actuating the pistons of said pumps, valves for each pump, means upon maximum pressure in the system for rendering the valves of the pumps inoperative, electromagnetic means controlled by the pressure in the system for rendering the valves of the low pressure cylinder operative, and pneumatic means controlled by the pressure in the system for rendering the valves of the high pressure cylinder operative, whereby said pumps may become effective.

20. In a fluid pressure system, the combination with a low pressure and a high pressure pump, of an electric motor for continuously driving the pistons of said pumps, means for gradually connecting said motor and circuit, valves for each pump, means for normally rendering the valves of the pumps inoperative, electromagnetic means controlled by the pressure in the system for rendering the valves of the low pressure pump effective after the motor has reached normal speed, and pneumatic means connected with the supply system for rendering the valves of the high pressure pump operative after the motor has reached normal speed.

21. In a pressure system, the combination with a low pressure and a high pressure pump, of a pressure system supplied thereby, an electric motor for continuously and simultaneously driving the pistons of said pumps, means for gradually connecting said motor in circuit, valves for said pumps, means for normally rendering said valves inoperative, electromagnetic means associated with the valves of the low pressure pump adapted upon actuation to render said valves operative, pneumatic mechanism connected with the pressure system and adapted upon actuation to render the valves of the high pressure pump operative, electromagnetic mechanism controlling said pneumatic mechanism, a circuit including the electromagnetic mechanisms, a switch controlled by the pressure in the system for controlling said circuit, said switch upon minimum pressure in the system causing closure of said circuit through said electromagnetic mechanisms after said motor has reached normal speed, whereby the valves of the pumps are rendered operative and the pumps effective.

22. In a pressure system, the combination with a high pressure and a low pressure pump connected with the pressure system, of a motor for continuously reciprocating the pistons within said pumps, valves for said pumps, electromagnetically controlled means associated with the valves and controlled directly by the pressure in the system, minimum pressure in the system causing actuation of said electromagnetic mechanism to render the valves operative, and maximum pressure in the system causing actuation of electromagnetic mechanism to cause the valves to again become inoperative.

23. In a pressure system, the combination with a high pressure pump and a low pressure pump for supplying the system, of an electric motor for continuously reciprocating the pistons of said pumps, mechanical means for normally rendering the valves of said pumps inoperative, whereby said pumps are ineffective, electromagnetic mechanism associated with the mechanical means and adapted upon energization to cause actuation thereof to allow the valves to operate to render the pumps effective, a circuit for said electromagnetic mechanism, and additional electromagnetic means controlled directly by the pressure in the system for controlling said circuit, minimum pressure in said system causing said additional electromagnetic means to close the circuit whereby said valve controlling electromagnetic means become energized to allow operation of the valves, maximum pressure in the system causing said additional electromagnetic means to open the circuit whereby said valve electromagnetic means become inert and said pumps ineffective.

24. In a pressure system, the combination with a high pressure pump and a low pressure pump connected with the system, of an electric motor for continuously reciprocating the pistons of said pumps, mechanical means associated with the suction valve of the pumps for rendering said valves inoperative, electromagnetic means for actuating said mechanical means to allow operation of the valves, and an electric circuit for said electromagnetic mechanism controlled directly by the pressure in the system, said circuit upon maximum pressure in the system being opened to render the electromagnetic mechanism inert and the mechanical mechanism effective, minimum pressure in the system causing closure of said circuit whereby said electromagnetic means becomes energized and said valves rendered operative.

25. In combination, a fluid pump, a motor driving said pump, a pressure system supplied by said pump, means for controlling the supply of energy to said motor, and means associated with the valves of said pump for automatically placing said valves in an inoperative condition when maximum value of the pressure in said system is reached and maintaining them in inoperative condition until minimum pressure is reached.

26. In combination, an air compressor, an electric motor driving said compressor, a pressure system supplied by said compressor, switching means for controlling the supply of current to said motor, and means for automatically opening the suction valves of said pump when maximum value of the pressure in said system is reached and for holding them in such open condition until minimum pressure is reached.

27. In combination, a fluid pump, an electric motor driving said pump, a pressure system supplied by said pump, switching means for controlling the motor circuit, a valve connecting with each end of the pressure cylinder, and means for simultaneously maintaining said valves in an open condition during a certain maximum pressure range in said system.

28. In combination, a fluid pump, an electric motor driving said pump, a pressure system supplied by said pump, switch means for controlling the motor circuit, a valve connecting with each end of the pump cylinder, means for maintaining said valves in an open condition during the continuance of a maximum pressure in said system, and an electromagnetic mechanism serving after pressure in said system is sufficiently decreased to allow the closure of said valves.

29. In combination, a fluid pump having valves, a motor driving said pump, a pressure system fed by said pump, means for preventing the actuation of said valves during a maximum pressure in said system, and electromagnetic mechanism serving to allow said valves to be actuated during a minimum pressure in said system.

30. In combination, a fluid pump, a motor driving said pump, a pressure system supplied by said pump, check valves for said pump, means for normally maintaining said check valves in an open condition, and electromagnetic means for rendering said valves operative upon a certain minimum pressure being reached in said pressure system.

31. In combination, a fluid pump, a motor continuously driving said pump, a pressure system supplied by said pump, check valves for said pump, electromagnetic means controlled by the pressure in said system and associated with the valves for allowing actuation of said valves upon minimum pressure in said system, and means upon inertness of said electromagnetic means for rendering said valves inoperative.

32. In combination, a fluid pump, a motor continuously driving said pump, a pressure system supplied by said pump, check valves for said pump, means upon maximum pressure in said system for maintaining said valves off their seats to render said pump inoperative, and electromagnetic means upon minimum pressure in said system for releasing said valves, whereby said pump becomes operative.

33. In combination, a fluid pump, an electro-motor for continuously driving said pump after being started, a pressure system supplied by said pump, switching means for controlling the motor circuit, a valve connecting with each end of the pump cylinder, means for maintaining said valves inoperative during the continuance of a maximum pressure in said system to render the pump ineffective, electro-magnetic mechanism serving after the pressure in said system is sufficiently decreased to allow the closure of said valves, whereby said pump becomes ineffective, and means associated with the switching means of the motor circuit for preventing actuation of the electromagnetic mechanism until the motor has reached normal speed.

34. In a fluid pressure system, the combination with a low pressure and the high pressure pump, of an electric motor for continuously driving the pistons of said pumps, discharge valves for the low pressure pump connected with a low pressure reservoir, discharge valves for the high pressure pump connected with a high pressure main reservoir, suction valves for the low pressure pump receiving from the atmosphere, suction valves for the high pressure pump receiving from the low pressure reservoir, means upon maximum pressure in the system for rendering the suction valves of the pumps inoperative to prevent effective operation of the pumps, and means upon minimum pressure in the system for rendering the suction valves operative, whereby the pumps become effective.

35. In a fluid pressure system, the combination with a low pressure and a high pressure pump, of an electric motor for continuously and simultaneously actuating the pistons of said pumps, discharge valves for the low pressure pump connected with a low pressure reservoir, discharge valves for the high pressure pump connected with a high pressure main reservoir, suction valves for the low pressure pump receiving from the atmosphere, suction valves for the high pressure pump receiving from the low pressure reservoir, mechanical means for rendering the valves of the low pressure pump inoperative, mechanical means actuated by the fluid from the low pressure reservoir for rendering the suction valves of the high pressure pump inoperative, electromagnetic means controlled directly by the pressure in the system for actuating said mechanical means associated with both pumps to allow operation of the suction valves thereof upon minimum pressure in the system, and means upon maximum pressure in the system for causing said electromagnetic means to become inactive whereby the valves of the pumps are again rendered inoperative.

36. In a pressure system, the combination with a fluid pump, of a motor for continuously driving said pump, a circuit for said motor, and electrical and mechanical means coöperating to render said pump ineffective when maximum pressure in the system is reached and for rendering said pump effective when minimum pressure in the system is reached.

37. In a pressure system, the combination with a fluid pump, of a motor for continuously driving said pump, a circuit for said motor, and electrical and mechanical means coöperating to render said pump ineffective when maximum pressure in the system is reached and for rendering said pump effective when minimum pressure in the system is reached, said electrical means operating independently of the motor circuit.

In witness whereof I hereunto subscribe my name this 28th day of September A. D. 1907.

WALTER J. RICHARDS.

Witnesses:

PAUL A. KNUDSEN,
R. A. WEGNER.